(12) United States Patent
Riley et al.

(10) Patent No.: US 6,793,274 B2
(45) Date of Patent: Sep. 21, 2004

(54) AUTOMOTIVE RAIL/FRAME ENERGY MANAGEMENT SYSTEM

(75) Inventors: Jon Riley, Farmington, MI (US); Michael J. Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 3 days.

(21) Appl. No.: 10/293,511

(22) Filed: Nov. 13, 2002

(65) Prior Publication Data

US 2003/0090129 A1 May 15, 2003

Related U.S. Application Data

(60) Provisional application No. 60/333,273, filed on Nov. 14, 2001.

(51) Int. Cl.[7] .................................................. B60J 5/00
(52) U.S. Cl. .............................. 296/187.03; 196/187.09
(58) Field of Search ........................... 296/205, 187.02, 296/187.03, 187.09, 187.08, 901; 428/613, 36.5

(56) References Cited

U.S. PATENT DOCUMENTS

| | | |
|---|---|---|
| 3,888,502 A | 6/1975 | Felzer et al. |
| 4,463,870 A | 8/1984 | Coburn, Jr. et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,769,951 A | 9/1988 | Kaaden |
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |
| 4,861,097 A | 8/1989 | Wycech |
| 4,867,271 A | 9/1989 | Tschudin-Mahrer |
| 4,901,500 A | 2/1990 | Wycech |

(List continued on next page.)

FOREIGN PATENT DOCUMENTS

| | | |
|---|---|---|
| DE | 196 35 734 A1 | 4/1997 |
| DE | 197 20 109 A1 | 11/1997 |
| DE | 197 03 429 A1 | 8/1998 |
| DE | 198 12 288 C1 | 9/1999 |
| DE | 198 56 255 C1 | 1/2000 |
| DE | 198 56 903 A1 | 6/2000 |
| EP | 0 588 182 A2 | 3/1994 |

(List continued on next page.)

OTHER PUBLICATIONS

Klein, M. and Adam Opel AG, "Application of Structural Foam in the Body in White—Reinforcement Roof Rail Side of the OPEL ASTRA", VDI Berichte, pp. 227–249.
International Search Report dated Apr. 2, 2003.
Written Opinion dated Aug. 27, 2003.

(List continued on next page.)

Primary Examiner—Joseph D. Pape
(74) Attorney, Agent, or Firm—Dobrusin & Thennisch PC

(57) ABSTRACT

An energy management system and device for use in an automotive frame, rail, or other structural component of an automotive vehicle. The frame or rail having a cavity or exposed surface capable of supporting at least one member. The member having an interior portion and an exterior portion with the interior portion being defined by at least one trigger or step change to the geometry of the inner portion to target and direct axial bending of the system. A reinforcing material, such as a polymer-based expandable material, is disposed along the exterior portion of a member prior to final assembly of the vehicle by the vehicle manufacturer. The system is activated as the vehicle undergoes the final vehicle assembly process and paint operation which activates and transforms the reinforcing material to expand, bond and structurally adhere the frame rail to mange, direct, and/or absorb energy in the event of an impact to the vehicle from an applied load or an external force.

22 Claims, 7 Drawing Sheets

U.S. PATENT DOCUMENTS

| | | | |
|---|---|---|---|
| 4,908,930 A | | 3/1990 | Wycech |
| 4,922,596 A | | 5/1990 | Wycech |
| 4,923,902 A | | 5/1990 | Wycech |
| 4,978,562 A | | 12/1990 | Wycech |
| 4,995,545 A | | 2/1991 | Wycech |
| 5,124,186 A | | 6/1992 | Wycech |
| 5,194,199 A | | 3/1993 | Thum |
| 5,266,133 A | | 11/1993 | Hanley et al. |
| 5,358,397 A | * | 10/1994 | Ligon et al. |
| 5,373,027 A | * | 12/1994 | Hanley et al. |
| 5,506,025 A | * | 4/1996 | Otto et al. |
| 5,575,526 A | | 11/1996 | Wycech |
| 5,631,027 A | * | 5/1997 | Takabatake |
| 5,660,116 A | * | 8/1997 | Dannawi et al. |
| 5,755,486 A | * | 5/1998 | Wycech |
| 5,766,719 A | * | 6/1998 | Rimkus |
| 5,819,408 A | * | 10/1998 | Catlin |
| 5,851,626 A | * | 12/1998 | McCorry et al. |
| 5,884,960 A | | 3/1999 | Wycech |
| 5,888,600 A | * | 3/1999 | Wycech |
| 5,894,071 A | * | 4/1999 | Merz et al. |
| 5,902,656 A | * | 5/1999 | Hwang |
| 5,921,048 A | * | 7/1999 | Francom et al. |
| 5,932,680 A | * | 8/1999 | Heider |
| 5,941,597 A | * | 8/1999 | Horiuchi et al. |
| 5,985,435 A | * | 11/1999 | Czaplicki et al. |
| 5,992,923 A | * | 11/1999 | Wycech |
| 5,997,077 A | * | 12/1999 | Siebels et al. |
| 6,003,274 A | * | 12/1999 | Wycech |
| 6,006,484 A | * | 12/1999 | Geissbuhler |
| 6,033,300 A | | 3/2000 | Schneider |
| 6,050,630 A | | 4/2000 | Hochet |
| 6,059,342 A | | 5/2000 | Kawai et al. |
| 6,068,424 A | | 5/2000 | Wycech |
| 6,079,180 A | | 6/2000 | Wycech |
| 6,092,864 A | | 7/2000 | Wycech et al. |
| 6,096,403 A | | 8/2000 | Wycech |
| 6,099,948 A | | 8/2000 | Paver, Jr. |
| 6,103,341 A | | 8/2000 | Barz et al. |
| 6,103,784 A | | 8/2000 | Hilborn et al. |
| 6,131,897 A | | 10/2000 | Barz et al. |
| 6,135,542 A | | 10/2000 | Emmelmann et al. |
| 6,149,227 A | | 11/2000 | Wycech |
| 6,150,428 A | | 11/2000 | Hanley, IV et al. |
| 6,165,588 A | | 12/2000 | Wycech |
| 6,168,226 B1 | | 1/2001 | Wycech |
| 6,189,953 B1 | | 2/2001 | Wycech |
| 6,196,621 B1 | | 3/2001 | VanAssche et al. |
| 6,199,940 B1 | | 3/2001 | Hopton et al. |
| 6,232,433 B1 | | 5/2001 | Narayan |
| 6,233,826 B1 | | 5/2001 | Wycech |
| 6,237,304 B1 | | 5/2001 | Wycech |
| 6,247,287 B1 | | 6/2001 | Takabatake |
| 6,253,524 B1 | | 7/2001 | Hopton et al. |
| 6,263,635 B1 | | 7/2001 | Czaplicki |
| 6,270,600 B1 | | 8/2001 | Wycech |
| 6,272,809 B1 | | 8/2001 | Wycech |
| 6,276,105 B1 | | 8/2001 | Wycech |
| 6,281,260 B1 | | 8/2001 | Hanley, IV et al. |
| 6,287,666 B1 | | 9/2001 | Wycech |
| 6,296,298 B1 | | 10/2001 | Barz |
| 6,303,672 B1 | | 10/2001 | Papalos et al. |
| 6,305,136 B1 | | 10/2001 | Papalos et al. |
| 6,311,452 B1 | | 11/2001 | Barz et al. |
| 6,315,938 B1 | | 11/2001 | Jandali |
| 6,319,964 B1 | | 11/2001 | Blank et al. |
| 6,321,793 B1 | | 11/2001 | Czaplicki et al. |
| 6,332,731 B1 | | 12/2001 | Wycech |
| 6,341,467 B1 | | 1/2002 | Wycech |
| 6,348,513 B1 | | 2/2002 | Hilborn et al. |
| 6,357,819 B1 | | 3/2002 | Yoshino |
| 6,358,584 B1 | | 3/2002 | Czaplicki |
| 6,368,438 B1 | | 4/2002 | Chang et al. |
| 6,372,334 B1 | | 4/2002 | Wycech |
| 6,378,933 B1 | | 4/2002 | Schoen et al. |
| D457,120 S | | 5/2002 | Broccardo et al. |
| 6,382,635 B1 | | 5/2002 | Fitzgerald |
| 6,383,610 B1 | | 5/2002 | Barz et al. |
| 6,389,775 B1 | | 5/2002 | Steiner et al. |
| 6,406,078 B1 | | 6/2002 | Wycech |
| 6,413,611 B1 | | 7/2002 | Roberts et al. |
| 6,419,305 B1 | | 7/2002 | Larsen |
| 6,422,575 B1 | | 7/2002 | Czaplicki et al. |
| H2047 H | | 9/2002 | Harrison et al. |
| 6,455,146 B1 | | 9/2002 | Fitzgerald |
| 6,457,577 B1 | | 10/2002 | Hopton et al. |
| 6,467,834 B1 | | 10/2002 | Barz et al. |
| 6,471,285 B1 | | 10/2002 | Czaplicki et al. |
| 6,474,722 B2 | | 11/2002 | Barz |
| 6,474,723 B2 | | 11/2002 | Czaplicki et al. |
| 6,482,486 B1 | | 11/2002 | Czaplicki et al. |
| 6,482,496 B1 | | 11/2002 | Wycech |
| 6,502,821 B2 | | 1/2003 | Schneider |
| 6,519,854 B2 | | 2/2003 | Blank |
| 6,523,857 B1 | | 2/2003 | Hopton et al. |
| 6,523,884 B2 | | 2/2003 | Czaplicki et al. |
| 6,546,693 B2 | | 4/2003 | Wycech |
| 6,561,571 B1 | | 5/2003 | Brennecke |
| 6,573,309 B1 | | 6/2003 | Reitenbach et al. |
| 6,575,526 B2 | | 6/2003 | Czaplicki et al. |
| 6,607,238 B2 | | 8/2003 | Barz |
| 6,619,727 B1 | | 9/2003 | Barz et al. |
| 6,634,698 B2 | | 10/2003 | Kleino |
| 6,641,208 B2 | | 11/2003 | Czaplicki et al. |
| 2001/0020794 A1 | | 9/2001 | Ishikawa |
| 2001/0042353 A1 | | 11/2001 | Honda et al. |
| 2002/0033617 A1 | | 3/2002 | Blank |
| 2002/0053179 A1 | | 5/2002 | Wycech |
| 2002/0074827 A1 | | 6/2002 | Fitzgerald et al. |

FOREIGN PATENT DOCUMENTS

| | | |
|---|---|---|
| EP | 0 611 778 A3 | 8/1994 |
| EP | 0 679 501 A1 | 11/1995 |
| EP | 0 775 721 A1 | 5/1997 |
| EP | 0 788 930 A1 | 8/1997 |
| EP | 0 891 918 A1 | 1/1999 |
| EP | 0 893 331 A1 | 1/1999 |
| EP | 0 893 332 A1 | 1/1999 |
| EP | 0 697 956 B1 | 6/1999 |
| EP | 1 006 022 A2 | 6/2000 |
| EP | 1 084 816 A2 | 3/2001 |
| EP | 1 122 156 A2 | 8/2001 |
| EP | 0 893 332 B1 | 3/2002 |
| EP | 1 208 954 A2 | 5/2002 |
| EP | 1 256 512 A2 | 11/2002 |
| EP | 1 006 022 B1 | 9/2003 |
| EP | 1 362 683 A2 | 11/2003 |
| EP | 1 362 769 A1 | 11/2003 |
| FR | 2 749 263 | 12/1997 |
| GB | 2 083 162 A | 3/1982 |
| GB | 2 156 412 A | 10/1985 |
| GB | 2 375 328 A | 11/2002 |
| JP | 10-53156 | 2/1998 |
| JP | 02001191949 A | 7/2001 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | WO 99/48746 | 9/1999 |

| | | | |
|---|---|---|---|
| WO | WO 99/50057 | | 10/1999 |
| WO | WO 00/12571 | | 3/2000 |
| WO | WO 00/12595 | | 3/2000 |
| WO | WO 00/13876 | * | 3/2000 |
| WO | WO 00/13958 | * | 3/2000 |
| WO | WO 00/20483 | * | 4/2000 |
| WO | WO 00/37302 | * | 6/2000 |
| WO | WO 00/37554 | * | 6/2000 |
| WO | WO 00/39232 | * | 7/2000 |
| WO | WO 00/40629 | * | 7/2000 |
| WO | WO 00/40815 | * | 7/2000 |
| WO | WO 00/43254 | * | 7/2000 |
| WO | WO 00/46461 | * | 8/2000 |
| WO | WO 00/52086 | | 9/2000 |
| WO | WO 00/55444 | | 9/2000 |
| WO | WO 01/30906 | | 5/2001 |
| WO | WO 01/54936 | | 8/2001 |
| WO | WO 01/56845 | | 8/2001 |
| WO | WO 01/71225 | | 9/2001 |
| WO | WO 01/83206 | | 11/2001 |
| WO | WO 01/88033 | | 11/2001 |
| WO | WO 02/10535 | | 2/2002 |
| WO | WO 03/042024 A1 | | 5/2003 |

OTHER PUBLICATIONS

Copending U.S. application Ser. No. 09/923,138 filed Aug. 6, 2001.
Copending European application Ser. No. 0130439.3 filed Dec. 20, 2001.
Copending U.S. application Ser. No. 09/459,756 filed Dec. 10, 1999.
Copending U.S. application Ser. No. 09/631,211 filed Aug. 3, 2000.
Copending U.S. application Ser. No. 09/655,965 filed Sep. 6, 2000.
Copending U.S. application Ser. No. 09/858,939 filed May 16, 2001.
Copending U.S. application Ser. No. 09/859,126 filed May 16, 2001.
Copending U.S. application Ser. No. 09/974,017 filed Oct. 10, 2001.
Copending U.S. application Ser. No. 09/676,725 filed Sep. 29, 2000.
Copending U.S. application Ser. No. 10/163,894 filed Jun. 4, 2002.
Copending U.S. application Ser. No. 09/939,152 filed Aug. 24, 2001.
Copending U.S. application Ser. No. 10/233,919 filed Sep. 3, 2002.
Copending U.S. application Ser. No. 10/234,902 filed Sep. 4, 2002.
Copending U.S. application Ser. No. 10/236,315 filed Sep. 6, 2002.
Copending U.S. application Ser. No. 10/008,505 filed Nov. 8, 2001.
Copending U.S. application Ser. No. 10/008,194 filed Nov. 8, 2001.
Copending U.S. application Ser. No. 60/398,411 filed Jul. 25, 2002.

* cited by examiner

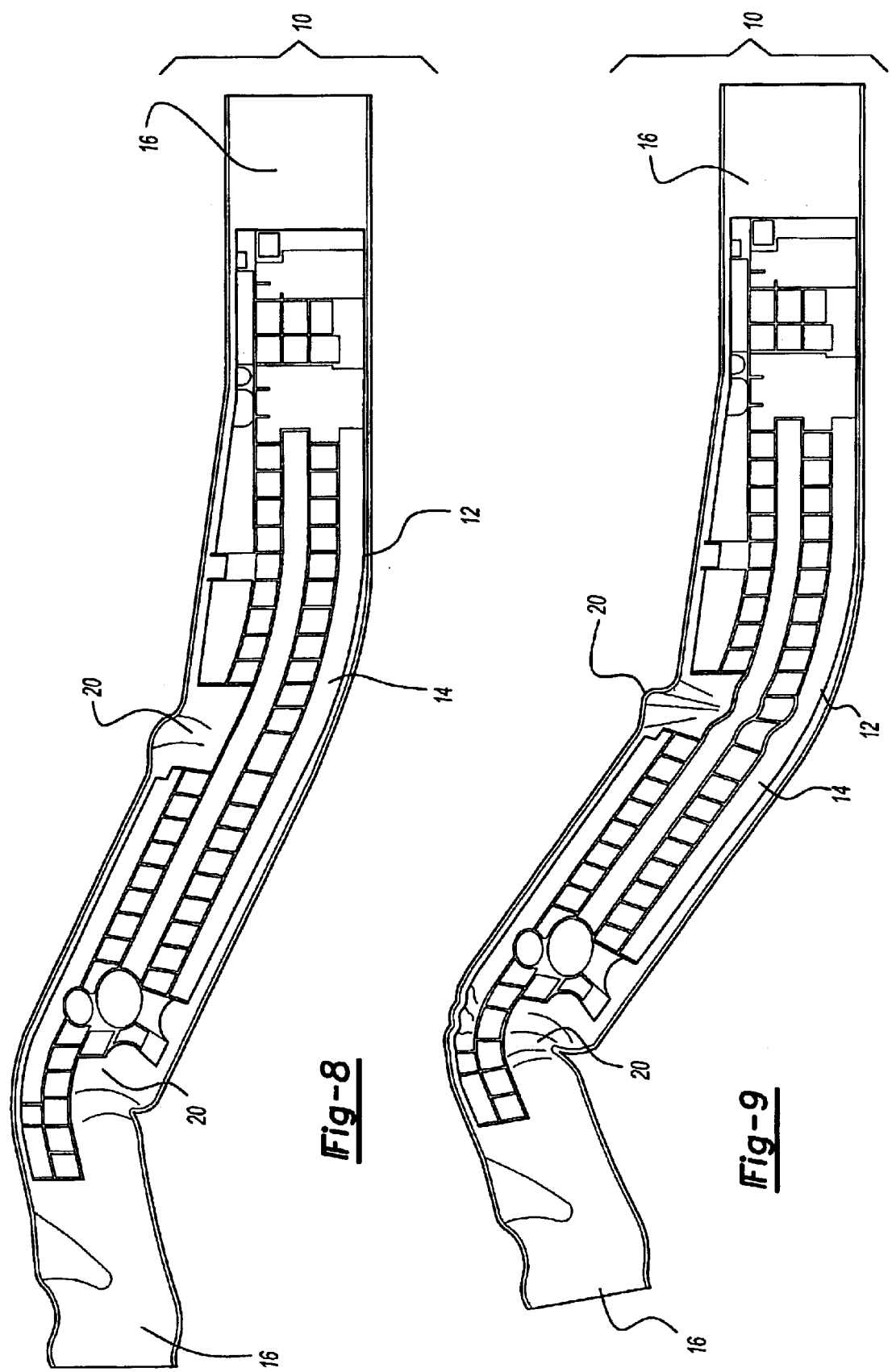

US 6,793,274 B2

AUTOMOTIVE RAIL/FRAME ENERGY MANAGEMENT SYSTEM

CLAIM OF BENEFIT OF FILING DATE

The present application claims the benefit of the filing date of U.S. Provisional Application Serial No. 60/333,273 filed Nov. 14, 2001.

FIELD OF THE INVENTION

The present invention relates generally to an energy management system for placement in different portions or structural cavities of an occupant transportation vehicle for the management, direction, and absorption of energy. More particularly, the present invention relates to a reinforcing energy management structure for use in an automotive rail, such as a frame, front rail, or other chosen portion of an automotive vehicle, which can be selectively tuned or targeted to help absorb, direct, and/or transfer energy in the vehicle body.

BACKGROUND OF THE INVENTION

For many years the transportation industry has been concerned with designing structural members that do not add significantly to the weight of a vehicle. At the same time, automotive applications require structural members capable of providing reinforcement to targeted portions of the vehicle and permit ingress and egress to the passenger compartment in the event of a collision or other impact event. While the devices found in the prior art may be advantageous in many applications, the prior art methods typically require the use of additional manufacturing processes and steps in either a supplier facility, a pre-production manufacturer stamping facility, or the final vehicle assembly planet which often increases labor demand, cycle time, capital expense, and/or required maintenance clean-up. Accordingly, there is needed a simple, low cost structure or system for reinforcing vehicle rails, such as a front rail or frame member, which reinforces the vehicle, enhances structural integrity, and can be efficiently incorporated into the vehicle manufacturing process. In addition, there is also a need for a relatively low cost system or structure which provides reinforcement and inhibits distortion to the frame or front rail structures in a vehicle, and which can serve to manage energy in a frontal/offset impact to the vehicle by reinforcing the frame member or front rail to help target applied loads and help redirect or tune energy management of deformation.

SUMMARY OF THE INVENTION

The object of the present invention is to redirect applied loads and manage impact energy by placing a reinforcement system in targeted areas of an automotive rail, frame member, or other portion of a vehicle. The system generally employs at least one member or insert, which is attached or adhered to the chosen portion of the vehicle such as a frame or rail or any other portion of an automotive vehicle selected to inhibit deformation in the event of impact to the vehicle. The member may also comprise a plurality of members suitable for receiving an application of an expandable or non-expandable reinforcing material coated, disposed, or placed over at least a portion of an exterior surface of the member or members. The reinforcing material disposed on the member is capable of activation when exposed to heat typically encountered in an automotive paint operation, such as e-coat and other paint cycles in a vehicle assembly plant. It is contemplated that the reinforcing material disclosed in the present invention, activates, optionally expands, and then adheres, cures, or bonds thereby structurally reinforcing and enhancing the strength and stiffness of the frame or front rail to redirect applied loads and energy. In one embodiment, the material is heat expandable and at least partially fills a cavity defined by the rail, frame, or selected portion of the vehicle by structurally adhering the rail and the frame depending upon the size and shape of the cavity, during the e-coat bake operation. In another embodiment, the reinforcing material is a melt flowable material comprising one or more components, which upon the application of heat will spread over a surface. The selected reinforcing material may also provide a variety of characteristics including structural reinforcement, stress-strain reduction, vibrational damping, noise reduction, or any combination thereof. In an alternative embodiment, the reinforcing material may be non-expandable or otherwise suitable for filling a defined volume or space within the selected insert or member.

In a particular preferred embodiment, the present invention further serves to manage crash energy typically encountered during frontal impact testing of an automotive vehicle. More specifically, the member or insert of the present invention may contain at least one and preferably a plurality of triggers consisting of notches, holes, or any other form of step change or alteration to the geometry of an internal or inner portion or portions of the member. The internal triggers of the present invention effectively target and direct axial bending to selected portions of the system and allow management of crash energy typically encountered during front offset testing. The system of the present invention further comprises a reinforcing or bonding material disposed over at least a portion of the member which can be extruded, molded, or "mini-application" bonded onto the member in either a pre-production setting, such as a stamping facility, or during the final assembly operation. The member, and the selected bonding or expandable material, is installed in the selected frame or rail prior to the e-coat or paint operation processing. Hence, the present invention provides flexibility in the manufacturing process since it can be utilized by either the frame or front rail manufacturer/supplier or the final vehicle manufacturer with reduced labor, capitol expense, maintenance requirements, and floor space demand. Once the reinfocing material bonds and cures to the selected rail or frame portion of the vehicle, distortion of the frame or front rail may be inhibited or managed during a frontal/offset impact event or any other application of impact energy to the exterior of the vehicle. By absorbing and/or transferring certain impact energy and providing reinforcement to the frame or rail portion of the vehicle, the present invention provides a system for managing deformation to the vehicle in the event of a frontal/offset impact.

BRIEF DESCRIPTION OF THE DRAWINGS

The features and inventive aspects of the present invention will become more apparent upon reading the following detailed description, claims and drawings, of which the following is a brief description:

FIG. 8 is an exploded perspective view of the automotive rail reinforcement system of the present invention prior to the impact of energy typically encountered in frontal impact testing of an automotive vehicle.

FIG. 9 is an exploded perspective view of the automotive rail reinforcement system of the present invention after the impact of energy typically encountered in frontal impact testing of an automotive vehicle and the effect of axial bending to the system of the present invention.

DETAILED DESCRIPTION OF THE INVENTION

Figure 1:
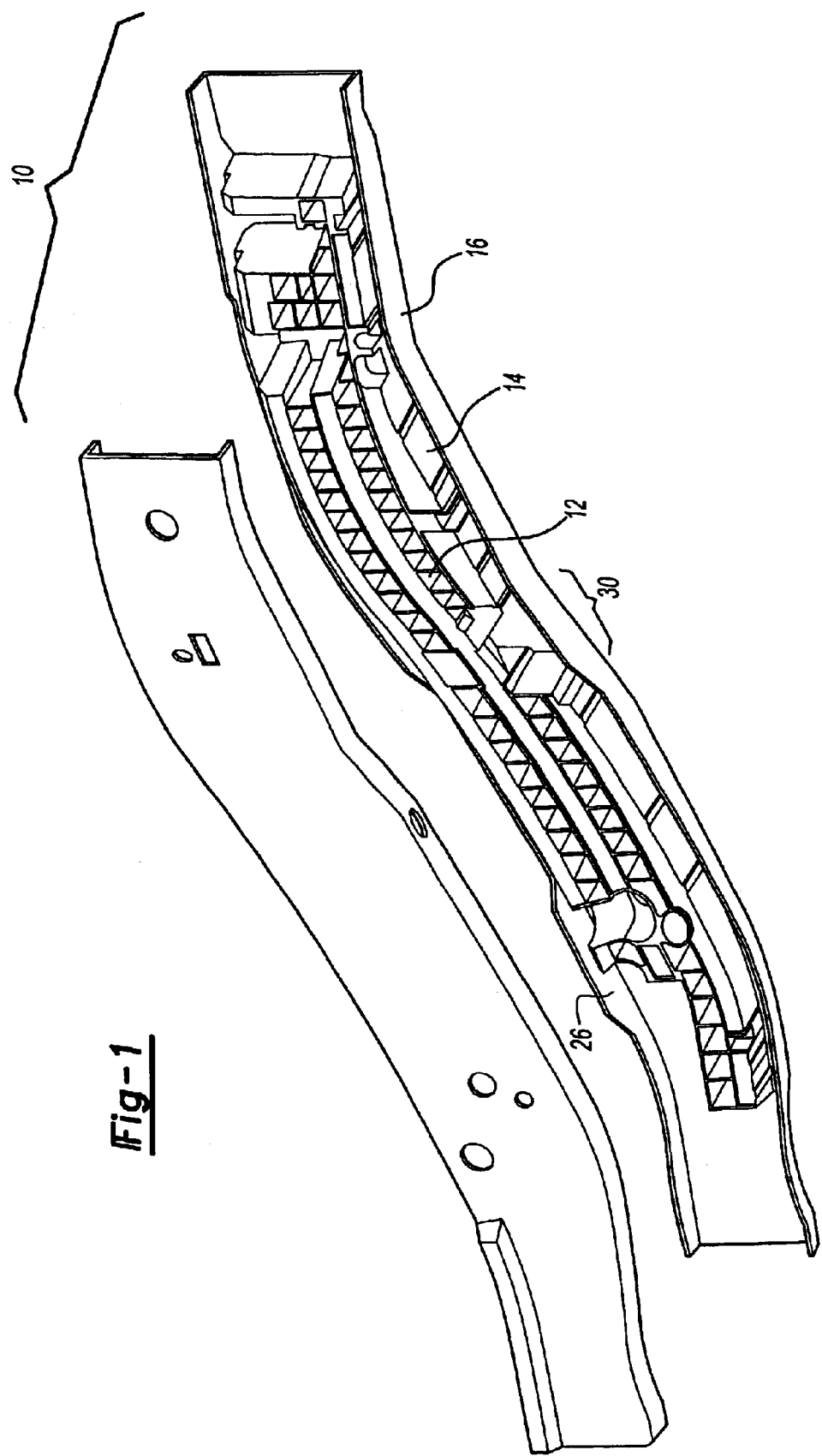
FIG. 1 is an isometric view of a partially exploded automotive frame rail showing the energy management enhancement system in accordance with the teachings of the present invention.

The invention relates to methods and systems for managing energy and reducing impact deformation characteristics of automotive vehicles in the event of a frontal/offset impact event to the vehicle. More particularly, the present invention relates to a system for reinforcing, directing impact energy, and tuning the management of said impact energy to portions of an automotive vehicle, such as a frame or rail, which effectuates the reduction and inhibition of physical deformation or structural movement to the occupant compartment in the event of an impact to the exterior of the vehicle from another object. The system absorbs, dissipates and/or transfers the impact energy to reduce and inhibit the resulting deformation to the automotive vehicle. A reduction in impact deformation to the vehicle may serve to allow continued passenger ingress and egress to the vehicle after an impact event and reduce repair time and costs.

The automotive industry generally utilizes two primary modes for frontal impact testing of vehicles: full and offset. Full frontal impact testing is utilized in the United States for both federal compliance and assessment testing. While these tests are typically performed at different speeds (i.e. approximately 30 mph for compliance and 35 mph for assessment), they both relate to impact of a barrier utilizing the full width of the front end structure of the tested vehicle. The primary goal of these tests is to assess occupant responses (femur loads, head injury criteria, chest deceleration, etc.) and validate the vehicle restraint systems (seatbelts, airbags, etc.). The offset impact test is typically performed at 40 mph with typically only 40% of the front end of the tested vehicle impacting the barrier. One of the primary goals of the offset impact test is to assess the structural integrity of the vehicle structure itself.

Design for frontal crash energy management is a multi-disciplinary process. Crash energy management is typically performed through a combination of the vehicle structure and restraint systems. Many automotive manufacturers seek vehicle structures that can be designed to absorb energy. Structural efficiency, defined as the ability to optimize energy management as a vehicle structure deforms upon impact, depends upon the configuration of the design. For purposes of frontal impact testing, the severe crush loads created by the impact of energy managing structures tend to decelerate the occupant compartment. The ability of the energy managing structures to transfer manageable loads to an occupant compartment, coupled with the ability of the restraint system(s) to effectively dissipate such loads, may help dictate how well the occupant compartment responds to extreme loading, as well as how the compartment sustains minimal deformation and intrusion under certain conditions. For these reasons, the prior art focuses on at least two major considerations in the design of vehicle structures for crash energy management: (1) the absorption of kinetic energy of the vehicle, and (2) the crash resistance or strength needed to sustain the crush process inherent to the testing process and maintain passenger compartment integrity.

Figure 1A:
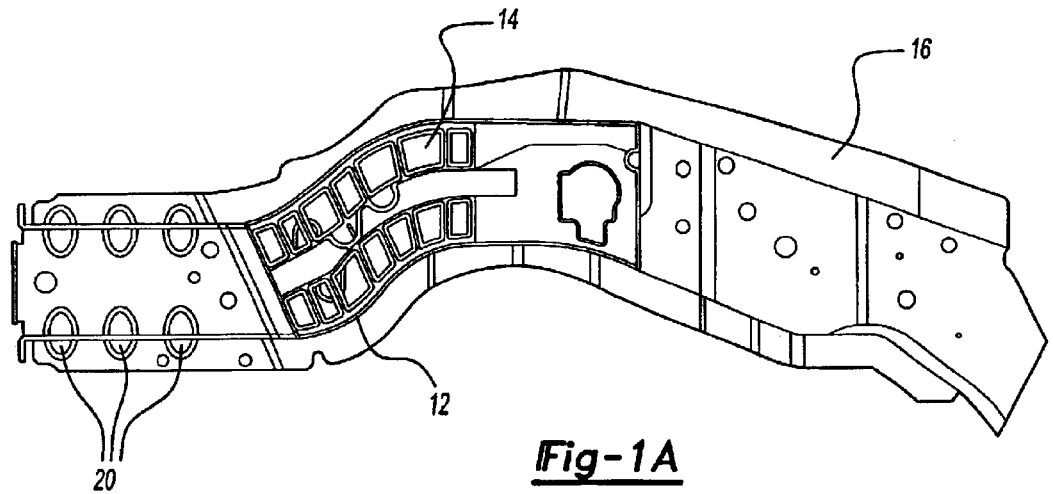
FIG. 1(a) is an exposed view of a portion of a reinforcement system typically found in the prior art depicting the three crush zones typically associated with frontal energy management structures in the automotive industry and further depicting the use of external triggers disposed on the exterior portion of a member known in the art.
Figure 2:
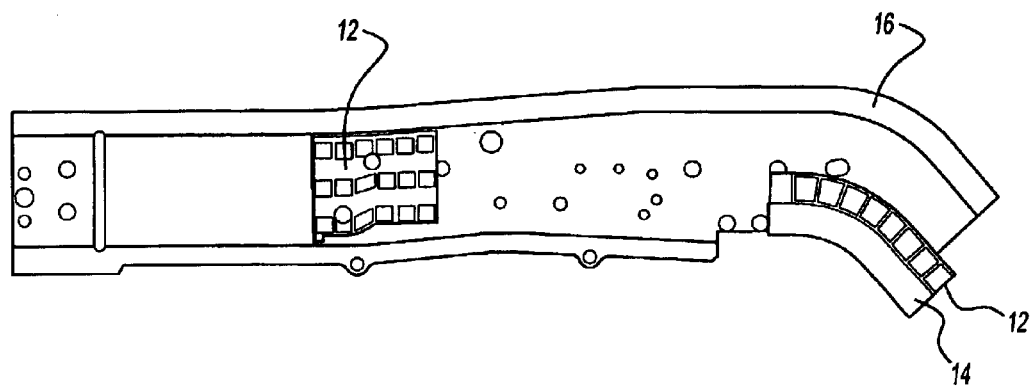
FIG. 2 is an exposed view of a portion of the present invention depicted in an automotive space frame architecture or body-in-white design showing the position of the at least one member with the reinforcing material in the uncured state attached to rail of an automotive vehicle.

Traditional frontal energy management structures of automotive vehicles generally consist of three distinct crush zones. First, there will be a soft zone, typically the bumper area or other exterior fascia, followed by two stiffer zones moving inwardly towards the occupant compartment. As defined and discussed herein, the two stiffer zones shall be referred to as primary and secondary. The primary crush zone is traditionally located immediately behind or adjacent to the soft crush zone, such as the bumper system of a vehicle, but in front of the powertrain compartment of a vehicle. The secondary crush zone is typically defined as the region bridging or tying the primary crush zone to the occupant compartment of the vehicle. For framed vehicles, such as trucks and larger automobiles, the secondary crush zone typically extends to the front body mount, as shown in FIG. 1a. For smaller vehicles, the frame can be integrated into the body-in-white design. This type of design is known in the art as space-frame architecture as shown in FIG. 2. In the case of space-frame vehicle structures, the secondary crush zone extends rearward bridging or tying the primary crush zone to the vehicle firewall and toe-board areas of the occupant compartment. Due to the proximity of the secondary crush zone to the occupant compartment of the vehicle, design requirements and energy management control techniques need to be utilized to minimize potential intrusion into the occupant compartment.

Accordingly, a main goal of the crush zone technology known in the art, is to manage the maximum amount of energy without compromising the integrity of the occupant compartment. The present invention addresses these needs through an energy management system and structure which provides a stable platform or system for the progressive collapsing of the primary crush zone. Namely, as shown at FIGS. 8 and 9, the present invention provides stability to the secondary crush zone which inhibits buckling or deformation while the primary crush zone is being crushed so that the overall structure is progressively collapsed in a predetermined and managed manner. As depicted in FIGS. 8 and 9, the present invention may comprise a plurality of triggers to effectuate axial collapse by creating opposing or dual bending modes. The system or structure of the present invention further serves to manage crash energy by attempting to control the deformation characteristics of either or both of the primary and secondary crush zones in such a way to minimize occupant compartment intrusion.

As is well known in the art, energy management structures deform (collapse) in a combination of axial and bending modes. Many existing energy management systems utilize the bending mode which results in lower energy management capabilities. For instance, since the bending mode is less efficient from an energy management standpoint, it typically requires much heavier designs or reinforcement configurations to manage the same amount and type of energy as an axially collapsing design. In most designs where weight is a criteria in vehicle design and performance, the axial mode is the preferred method of energy management. The bending mode, which involves the formation of localized hinge mechanisms and linkage type kinematics, is also a lower energy mode. For example, a structure will have a tendency to collapse in a bending mode due to the lower energy mode. Based upon this, even a structure specifically designed for axial collapse will default to the bending mode unless other structural features are provided in the design to enhance stability and resistance to off-angle loading.

Axial folding is also considered to be the most effective mechanism of energy absorption. It is also the most difficult to achieve due to potential instability and the lower energy default to the bending mode. The energy management system or structure of the present invention seeks to maximize axial collapse of portions of an automotive vehicle, while minimizing bending, through the use of at least one, and preferably a plurality of triggers designed within targeted portions of either or both of the primary and secondary crush zones. The trigger or triggers of the present invention are defined as a change or discontinuity in the part geometry of either or both of the primary and secondary crush zones forming the structure of the present invention designed to create stress risers to cause localized bending. A plurality of triggers, or combinations of different geometrically designed triggers, are utilized in the present invention to initiate folds in the structure inducing axial collapse in targeted portions of at least one of the three distinct crush zones of the frontal energy management structure shown in FIGS. 1 and 2. The triggers of the present invention are sized and designed to ensure that axial collapse of the structure shown at FIGS. 1 and 2 can occur at sufficiently high loads in order to maximize the amount of energy managed by the structure or the amount of energy typically encountered in frontal impact testing.

Triggers currently found in the prior art have generally been modifications to the exterior portions of metal structural reinforcement members or inserts used to reinforce a chosen body portion or cavity of an automotive vehicle, such as a rail, pillar, cross-member, etc., as well as any other area immediately adjacent to the occupant compartment of an automotive vehicle. These prior art triggers typically consist of holes or part contours to the exterior portion of the structural reinforcement member or insert. However, through modifications to the internal or inner portions of a member or insert, the present invention provides at least one, and preferably a plurality of internal triggers for use in managing energy typically encountered by an automotive vehicle during frontal impact testing. The internal triggers of the present invention effectively target and direct axial bending to selected portions of the structure and can comprise notches, holes, or any other form of step change or alteration to the geometry of an inner portion or portions of the structural reinforcement member or insert. For example, the structural reinforcement member or insert of the present invention, serves a plurality of purposes and provides a method for managing impact energy. First, the member or insert acts as a stabilizer which reinforces the secondary crush zone thereby allowing the primary crush zone to maximize axial crush. Once the primary crush zone has achieved maximum ability to absorb impact energy, the secondary crush zone of the structure of the present invention must be designed to absorb some additional energy as a means to reduce deformation to the occupant compartment of the vehicle. The structure of the present invention, utilizing a plurality of triggers such as notches or a cut-away section of the member or insert, serves to initiate bending of the structure based upon its existing geometry.

In one embodiment of the present invention, at least one insert or member 12 is placed within, attached, affixed, or adhered to at least a portion of a frame or rail of an automotive vehicle wherein at least one member 12 includes an expandable or reinforcing material 14 supported by, and disposed along portions of the member 12. The member 12 has an interior and an exterior portion and may be configured in any shape, design, or thickness corresponding to the dimensions of the selected frame or rail of the vehicle and may further comprise a plurality of triggers 20 integrated within an interior portion of the member 12, which are designed and incorporated to specifically tune or target impact energy for either absorption or redirection to other portions of the vehicle. The reinforcing material 14 extends along at least a portion of the length of the exterior portion of the member 12, and may fill at least a portion of a cavity or space defined within the frame or rail 16. It is contemplated that the triggers 20 of the present invention may comprise a notch or cut-away portion of the selected member 12 that may or may not have an amount of reinforcing material 14 disposed over trigger or triggers 20.

The system 10 generally employs at least one member 12 adapted for stiffening the structure to be reinforced, such as a frame or front rail 16 found in automotive vehicles, and helping to better manage impact energy typically encountered in a frontal/offset impact to the vehicle. In use, the member or members 12 are disposed within or mechanically attached, snap-fit, affixed, or adhered by an adhesive or other adhering material onto at least a portion of the chosen frame or front rail 16 with the reinforcing material 14 serving as a load transferring, energy absorbing medium disposed along at least one exterior surface of the member 12. In one embodiment, the member or members 12 are comprised of a molded polymeric carrier, an injection molded polymer, graphite, carbon, or a molded metal such as aluminum, magnesium, or titanium as well as an alloy derived from the materials or a foam derived from the materials or other metallic foam and is at least partially coated with a reinforcing material 14 on at least one of its sides, and in some instances on four or more sides.

In addition, it is contemplated that the member 12 could comprise a nylon or other polymeric material as set forth in commonly owned U.S. Pat. No. 6,103,341, expressly incorporated by reference herein, as well as injection molded, extruded, die cast, or machined member comprising materials such as polysulfone, polyamides (e.g.), nylon, PBI, or PEI. The member or members 12 may also be selected from materials consisting of aluminum, extruded aluminum, aluminum foam, magnesium, magnesium alloys, molded magnesium alloys, titanium, titanium alloys, molded titanium alloys, polyurethanes, polyurethane composites, low density solid fillers, and formed SMC and BMC. Still further, the member 12 adapted for stiffening the structure to be reinforced could comprise a stamped and formed cold-rolled steel, a stamped and formed high strength low alloy steel, a roll formed cold rolled steel, or a roll formed high strength low alloy steel.

Still further, it will be appreciated that the insert or member 12 used in the present invention, as well as the material forming the geometric step-changes or triggers 20 found in the member 12 of the present invention, may comprise a reactive or non-reactive material, which yields high compressive strength and moduli and may either form the carrier or member itself or be capable of filling or coating the insert or member 12. Generally speaking, the member 12 may be composed of a material which exhibits such higher compressive strength and moduli may be selected from the group consisting of a syntactic foam, syntactic-type foams with low density or reinforcing fillers (e.g., carbon fillers, carbon fibers, carbon powder, and materials sold under the trade name KEVLAR), spheres, hollow spheres, ceramic spheres, aluminum pellets, and fibers, such as glass fibers, wood fibers, or other space filling fibrous materials, including pelletized and extruded formulations thereof. In addition, the insert or member 12 may comprise a concrete foam, syntactic foam, aluminum foam, aluminum foam pellets, or other metallic foam, as well as alloys thereof. An example of such materials include commonly assigned U.S. Provisional Patent Application Serial No. 60/398,411 for "Composite Metal Foam Damping/Reinforcement Structure" filed Jul. 25, 2002 and hereby incorporated by reference. Other materials suitable for use as the insert or member 12 in the present invention include polysulfone, aluminum, aluminum foam, and other metals or metallic foams, concrete, polyurethane, epoxy, phenolic resin, thermoplastics, PET, SMC, and carbon materials sold under the trade name KEVLAR. In addition, it is also contemplated that the insert or member 12 of the present invention, or portions or volumes defined by the insert or member 12 of the present invention, may utilize or comprise a material sold under the trade name ISOTRUSS, as described and set forth in U.S. Pat. No. 5,921,048 for a Three-Dimensional Iso-Truss Structure issued Jul. 13, 1999, WO/0210535 for Iso-Truss Structure published by the World Intellectual Property Organization on Feb. 7, 2002, and a pending U.S. provisional patent application before the U.S. Patent & Trademark Office entitled: Method And Apparatus For Fabricating Complex, Composite Structures From Continuous Fibers, all of which have been commonly-assigned to Brigham Young University and are hereby incorporated by reference herein.

It is further contemplated that any number of the suitable materials disclosed and set forth herein for use as the insert or member 12 of the present invention may be formed, delivered, or placed into a targeted or selected portion of a transportation vehicle (i.e. land, rail, marine, or aerospace vehicle) through a variety of delivery mechanisms and systems that are known in the art. For example, the material may be poured, pumped, stamped, extruded, casted, or molded into any number of desired shapes or geometry depending upon the selected application or area to be reinforced. From a processing or manufacturing standpoint, the selected member 12 may be injection molded, compression molded, transfer molded, injection-compression molded, blowmolded, reaction injection molded, or thixomolded. Further, the material comprising the member 12 may be reactive, non-reactive, expandable, or non-expandable and may be further utilized, incorporated, or filled into a hollow core, shell, or blow-molded carrier for later placement within a selected portion of the vehicle during any phase of the pre-manufacturing or manufacturing process.

A number of structural reinforcing foams are known in the art and may be used to produce the reinforcing material 14 of the present invention. A typical reinforcing material 14 includes a polymeric base material, such as an epoxy resin or ethylene-based polymer which, when compounded with appropriate ingredients (typically a blowing agent, a curing agent, and perhaps a filler), typically expands and cures in a reliable and predictable manner upon the application of heat or another activation stimulus. The resulting material has a low density and sufficient stiffness to impart desired rigidity to a supported article. From a chemical standpoint for a thermally-activated material, the reinforcing material 14 is initially processed as a thermoplastic material before curing. After curing, the reinforcing material 14 typically becomes a thermoset material that is fixed and incapable of flowing.

The reinforcing material 14 is generally a thermoset material, and preferably a heat-activated epoxy-based resin having foamable characteristics upon activation through the use of heat typically encountered in an e-coat or other automotive paint oven operation. As the reinforcing material 14 is exposed to heat energy or other energy source, it expands, cross-links, and structurally bonds to adjacent surfaces. An example of a preferred formulation is an epoxy-based material that may include polymer modificis such as an ethylene copolymer or terpolymer that is commercially available from L&L Products, Inc. of Romeo, Mich., under the designations L-5204, L-5206, L-5207, L-5208, L-5209, L-5214, and L-5222. One advantage of the preferred reinforcing material 14 over prior art materials is the preferred material 14 can be processed in several ways. Possible processing techniques for the preferred materials include injection molding, blow molding, thermoforming, direct deposition of pelletized materials, extrusion or extrusion with a mini-applicator extruder. This enables the creation of part designs that exceed the design flexibility capability of most prior art materials. In essence, any reinforcing material 14 that imparts structural reinforcement characteristics may be used in conjunction with the present invention. The choice of the reinforcing material 14 used will be dictated by performance requirements and economics of the specific application and requirements. Generally speaking, these automotive vehicle applications and selected areas to be reinforced may utilize technology and processes such as those disclosed in U.S. Pat. Nos. 4,922,596, 4,978, 562, 5,124,186, and 5,884,960 and commonly assigned U.S. Pat. Nos. 6,467,834, 6,474,723, 6,474,722, 6,471,285, 6,419,305, 6,383,610, 6,358,584, 6,321,793, 6,311,452, 6,296,298, 6,263,635, 6,131,897, as well as commonly-assigned U.S. patent application Ser. Nos. 09/524,961 filed Mar. 14, 2000, 60/223,667 filed Aug. 7, 2000, 60/225,126 filed Aug. 14, 2000, Ser. No. 09/676,725 filed Sep. 29, 2000, Ser. No. 10/008,505 for Structural Foam published by the U.S. Patent & Trademark Office on Oct. 31, 2002, and 09/459,756 filed Dec. 10,1999, all of which are expressly incorporated by reference.

Additional expandable or reinforcing materials 14 that could be utilized in the present invention include other materials which are suitable as bonding, energy absorbing, or acoustic media and which may be heat activated foams which generally activate and expand to fill a desired cavity or occupy a desired space or function when exposed to temperatures typically encountered in automotive e-coat curing ovens and other paint operation ovens. Though other heat-activated materials are possible, a preferred heat activated material is an expandable or flowable polymeric formulation, and preferably one that can activate to foam, flow, adhere, or otherwise change states when exposed to the heating operation of a typical automotive assembly painting operation. For example, without limitation, in one embodiment, the polymeric foamable material may comprise an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foamable formulations commercially available include polymer-based materials available from L&L Products, Inc. of Romeo, Mich., under the designations as L-2018, L-2105, L-2100, L-7005, L-7101, L-7102, L-2411, L-2420, L-4141, etc. and may comprise either open or closed cell polymeric base material.

Further, it is contemplated that the reinforcing material 14 of the present invention may comprise acoustical damping properties which, when activated through the application of heat, can also assist in the reduction of vibration and noise in the overall automotive frame, rail, and/or body of the vehicle. In this regard, the now reinforced and vibrationally damped frame or front rail 16 will have increased stiffness which will reduce natural frequencies, that resonate through the automotive chassis thereby reducing transmission, blocking or absorbing noise through the use of the conjunctive acoustic product. By increasing the stiffness and rigidity of the frame or front rail, the amplitude and frequency of the overall noise/vibration that occurs from the operation of the vehicle and is transmitted through the vehicle can be reduced. Although the use of such impact absorbing materials and members are directed to an automotive frame, it is contemplated that the present invention can be utilized in other areas of an automotive vehicles that are used to ensure ingress and egress capability to the vehicle by both passengers as well as cargo, such as closures, fenders, roof systems, and body-in-white (BIW) applications which are well known in the art.

In addition to the use of an acoustically damping material along the member 12, the present invention could comprise the use of a combination of an acoustically damping material and a reinforcing material 14 along different portions or zones of the member 12 depending upon the requirements of the desired application. Use of acoustic expandable materials in conjunction with a reinforcing material 14 may provide additional structural improvement but primarily would be incorporated to improve NVH characteristics.

While several materials for fabricating the impact absorbing or reinforcing material 14 have been disclosed, the material 14 can be formed of other selected materials that are heat-activated or otherwise activated by an ambient condition (e.g. conductive materials, welding applications, moisture, pressure, time or the like) and expand in a predictable and reliable manner under appropriate conditions for the selected application. One such material is the epoxy based resin disclosed in commonly-assigned U.S. Pat. No. 6,131,897 for Structural Reinforcements, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, polyurethane materials with high glass transition temperatures, and mixtures or composites that may include even metallic foams such as an aluminum foam composition. See also, U.S. Pat. Nos. 5,766, 719; 5,755,486; 5,575,526; 5,932,680 (incorporated herein by reference). In general, the desired characteristics of the reinforcing material 14 include high stiffness, high strength, high glass transition temperature (typically greater than 70 degrees Celsius), and good adhesion retention, particularly in the presence of corrosive or high humidity environments.

In applications where a heat activated, thermally expanding material is employed, an important consideration involved with the selection and formulation of the material comprising the structural foam is the temperature at which a material reaction or expansion, and possibly curing, will take place. In most applications, it is undesirable for the material to activate at room temperature or the ambient temperature in a production line environment. More typically, the structural foam becomes reactive at higher processing temperatures, such as those encountered in an automobile assembly plant, when the foam is processed along with the automobile components at elevated temperatures. While temperatures encountered in an automobile assembly body shop ovens may be in the range of 148.89° C. to 204.44° C. (300° F. to 400° F.), and paint shop oven temps are commonly about 93.33° C. (215° F.) or higher. If needed, various blowing agents activators can be incorporated into the composition to cause expansion at different temperatures outside the above ranges. Generally, prior art expandable foams have a range of expansion ranging from approximately 100 to over 1000 percent. The level of expansion of the material may be increased to as high as 1500 percent or more, but is typically between 0% and 300%. In general, higher expansion will produce materials with lower strength and stiffness properties.

It is also contemplated that the reinforcing material 14 could be delivered and placed into contact with the member through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In another embodiment, the reinforcing material 14 is provided in an encapsulated or partially encapsulated form, which may comprise a pellet, which includes an expandable foamable material encapsulated or partially encapsulated in an adhesive shell, which could then be attached to the member in a desired configuration. An example of one such system is disclosed in commonly assigned U.S. Pat. No. 6,422,575 for an "Expandable Pre-Formed Plug" issued Jul. 23, 2002, hereby incorporated by reference. In addition, preformed patterns may also be employed such as those made by extruding a sheet (having a flat or contoured surface) and then die cut in accordance with a predetermined configuration.

Figure 3:
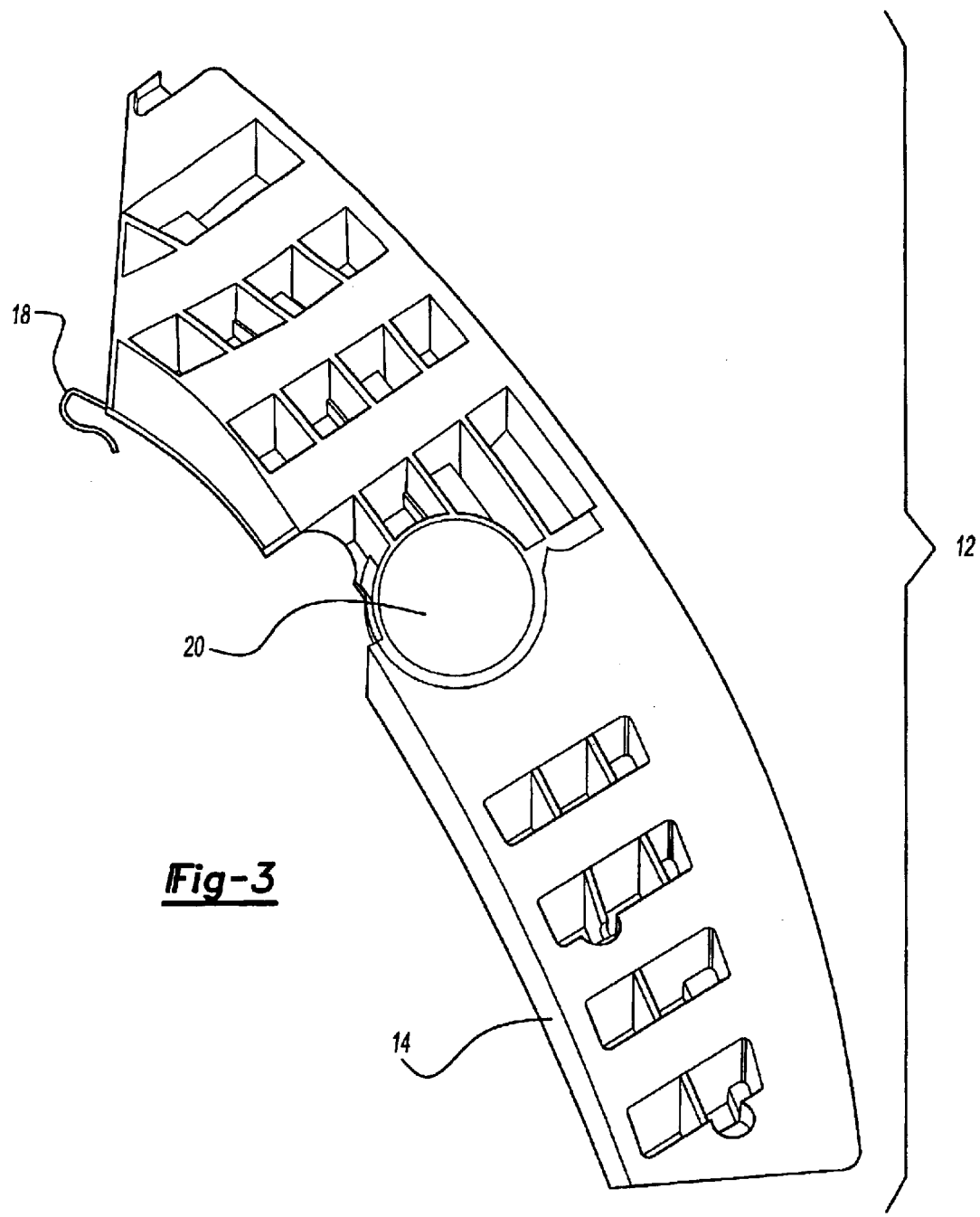
FIG. 3 is a portion of the system described in FIG. 1, showing an alternative embodiment of the at least one member of the present invention with the reinforcing material in the uncured state prior to attachment to the frame or rail of an automotive vehicle and further showing the attachment means of the present invention in the form of a clip assembly.
Figure 4:
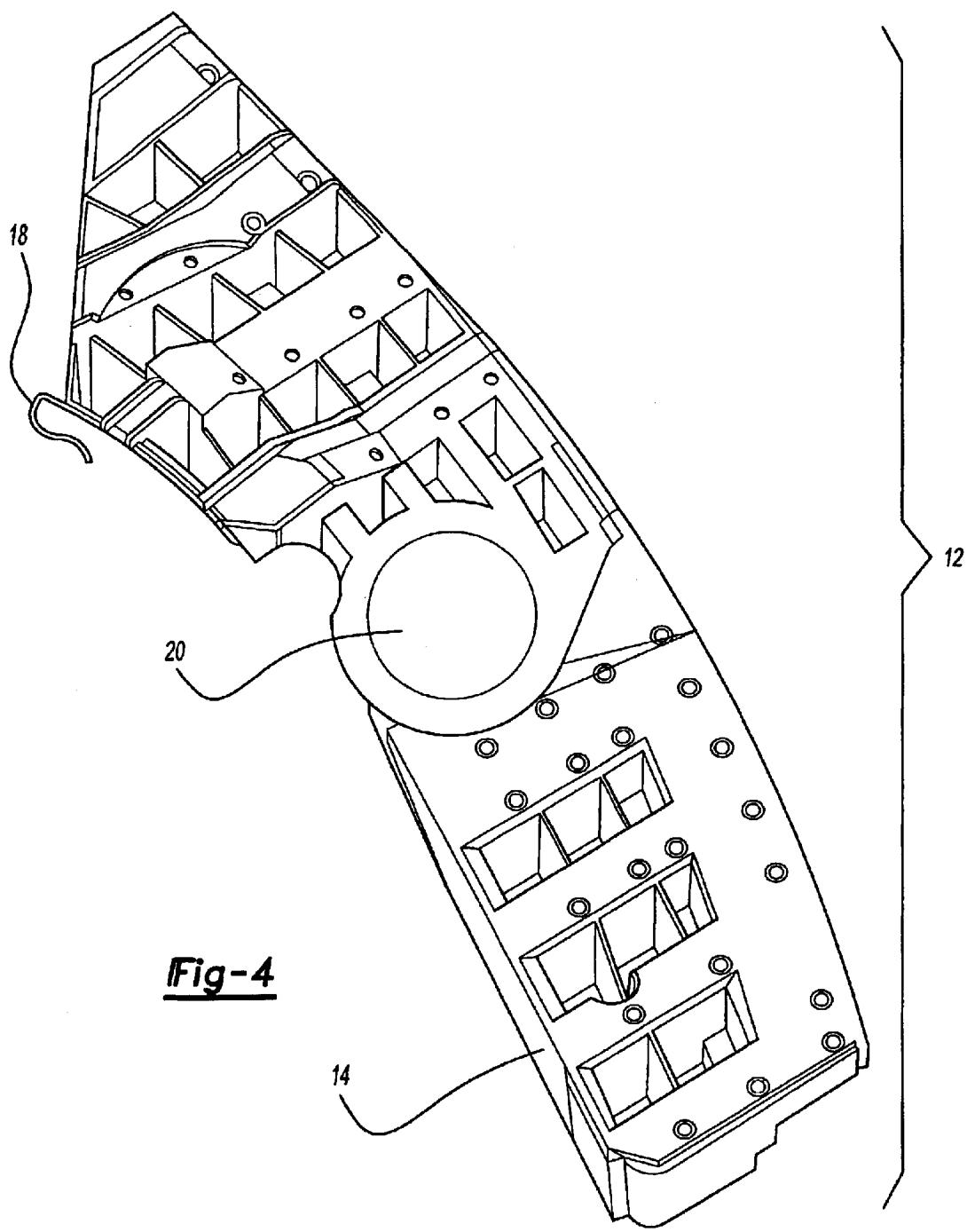
FIG. 4 is a portion of the system described in FIG. 1, showing an alternative embodiment of the at least one member of the present invention with the reinforcing material in the uncured state prior to attachment to the frame or rail of an automotive vehicle.
Figure 5:
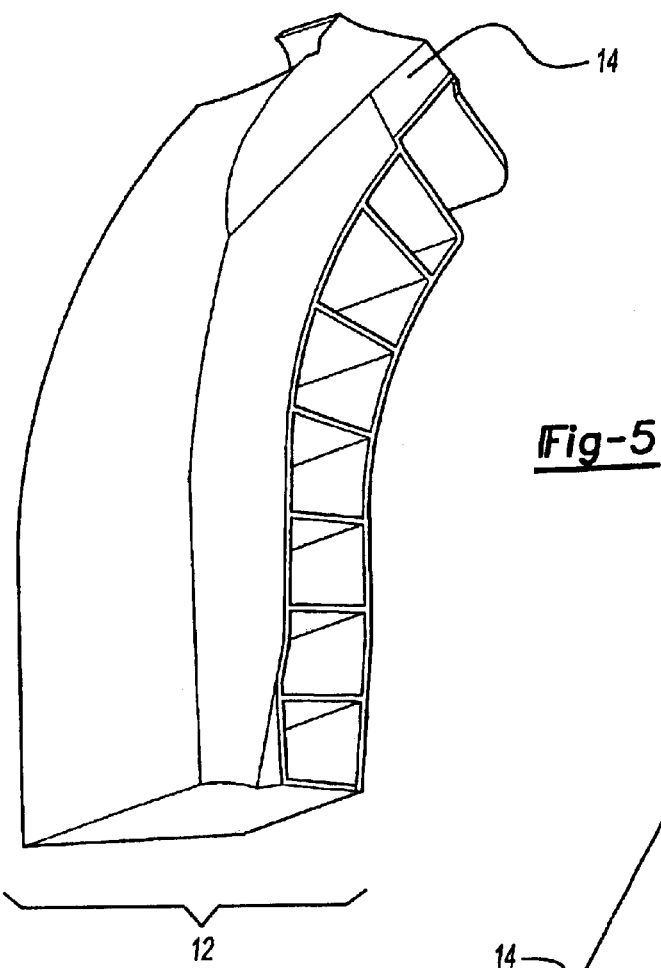
FIG. 5 is a portion of the system described in FIG. 1, showing an alternative embodiment of the at least one member of the present invention with the reinforcing material in the uncured state prior to attachment to the frame or rail of an automotive vehicle.
Figure 6:
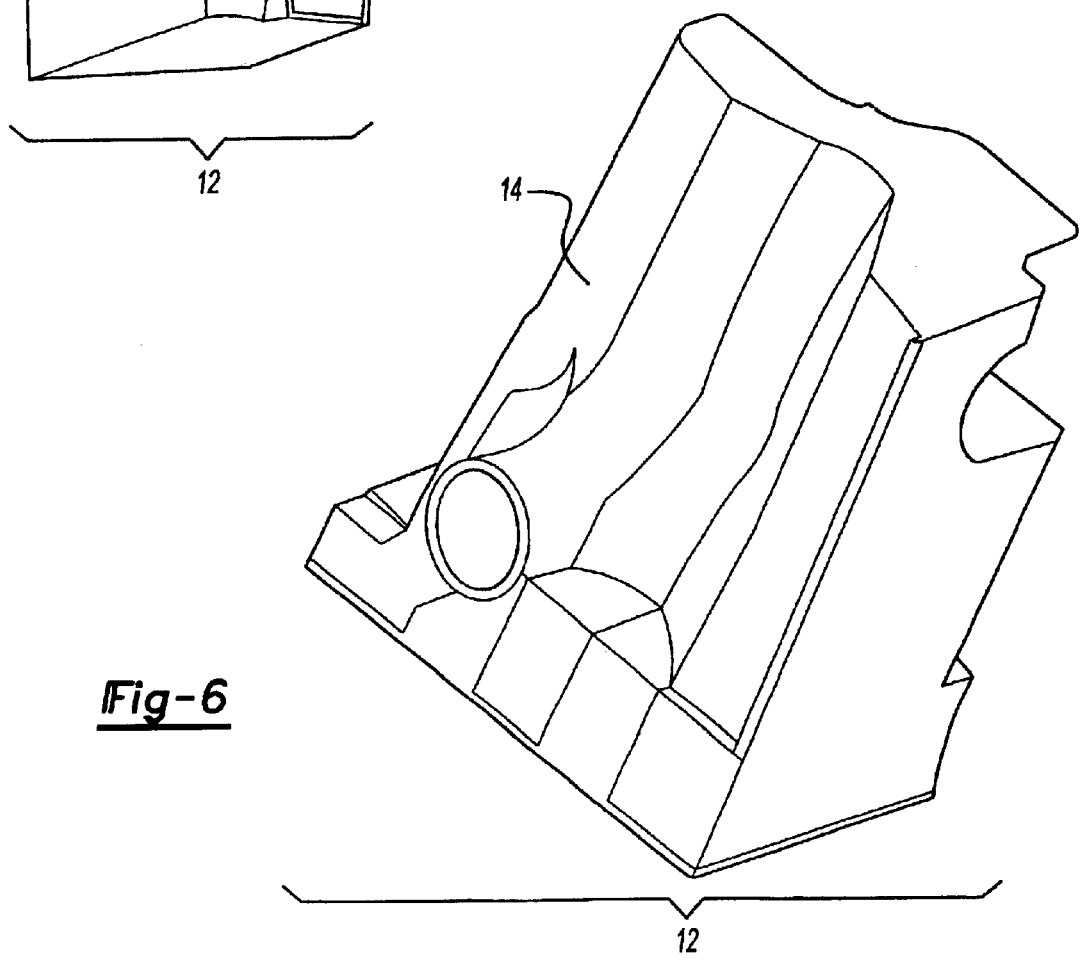
FIG. 6 is a portion of the system described in FIG. 1, showing an alternative embodiment of the at least one member of the present invention with the reinforcing material in the uncured state prior to attachment to the frame or rail of an automotive vehicle.

The present invention is graphically represented in FIG. 1 and includes of an automotive frame or rail energy management enhancement system 10 formed in accordance with the teachings of the present invention. The system 10 imparts an increased capability redirect applied loads and impact energies to a preferred portion of an automotive vehicle and, thus, may be used in a variety of applications and areas of an automotive or other moving vehicle, such as land, marine, rail, and aerospace vehicles. For instance, the energy management enhancement system 10 may be used to inhibit deformation and distortion to targeted portions of an automotive vehicle, including the frame, rail, door, or other structural members used in vehicles, in the event of an impact to the exterior of the vehicle by an outside body. The system 10 serves to target, tune, or manage energy for absorption and/or transfer to other portions of the vehicle. As shown in FIGS. 1 and 2, the present invention comprises at least one member 12 having an interior portion and an exterior portion capable of receiving and supporting a suitable amount of a reinforcing material 14 molded or bonded on its sides which can be placed, geometrically constrained, attached, or adhered to at least a portion of an automotive structural rail or frame 16 through an attachment means 18 used to place the member 12 within the rail or frame 16. The attachment means 18 may consist of a self-interlocking assembly, gravity/geometrically constrained placement, adhesive, a molded in metal fastener assembly such as a clip, push pins or snaps, integrated molded fasteners such as a clip, push pins, or snaps as well as a snap-fit assembly which is well known in the art. As shown in FIGS. 3 and 4, the attachment means 18 may consist of a clip. The automotive frame or rail 16 imparts structural integrity to the vehicle and may serve as the carrier of certain body panels of the automotive vehicle which may be viewable, and capable of receiving impact energy, from the exterior of the vehicle. By attaching the member 12 having the reinforcing material 14 to the frame or rail 16, additional structural reinforcement is imparted to the targeted portion of the frame or rail 16 where the member 12 is attached.

The present invention serves to place this targeted reinforcement in selected areas of a frame or rail 16 and provides the capability to absorb, direct, or manage impact energy typically encountered during an impact event from an external source or body, such as that typically encountered during a frontal/offset impact or collision. It is contemplated that the member 12 and the reinforcing material 14, after activation, create a composite structure whereby the overall system 10 strength and stiffness are greater than the sum of the individual components. In the event of an impact to the exterior of the vehicle, the impact energy is managed by either energy absorption/dissipation or targeted direction of the energy to specific areas of the vehicle.

The energy management features of the present invention utilizes targeted placement of a plurality of triggers 20 incorporated within the interior or inner portion of the member 12 or the exterior or outer portion of the member 12 along the frame or rail 16, as shown in FIG. 1. The triggers 20 are targeted or otherwise tuned for placement along either or both of selected areas of the members 12 or, alternatively, the frame or rail 16 itself, to direct the placement of energy to targeted areas of the vehicle during an impact and initiate folds in the structure inducing axial collapse. As shown in FIGS. 2–6, the system 10 of the present invention can be integrated within vehicle cavities utilizing a plurality of members 12 in a variety of predetermined shapes, forms, and thicknesses corresponding to the size, shape, and form of the cavity of the specific automotive application selected for energy management without compromising the visual appearance, functionality, or aesthetic quality of the exterior portions and paintable surfaces of the vehicle. In a preferred embodiment, the trigger or plurality of triggers 20 are incorporated and integrated within an interior portion of the member 12 and designed as notches, holes, or any other step change in the geometry of the interior portion of the member. However, the present invention also contemplates the use of pre-formed triggers 20 in the rail 16 or along selected portions of either or both of the inner and outer portions of the member 12. In some cases the triggers 20 may simply consist of a segment of the interior portion of the member that is specifically not coated with an expandable material as shown in FIG. 2. In other applications, a plurality of triggers 20 may be utilized such as a notch as shown in FIG. 1 or a cut-out hole of a portion of both the inner and outer member 12, as also shown in FIG. 1. As graphically shown in FIGS. 3 and 4, a trigger 20 of the present invention may also comprise a hole or other step change in the geometry of member 12 comprising a varying wall thickness of the trigger 20 with or without application if the reinforcing material 14.

The reinforcing material 14 includes an impact energy absorbing, structural reinforcing material, which results in either a rigid or semi-rigid attachment to at least one member 12 having at least one trigger 20. It is contemplated that the reinforcing material 14 could be applied to at least one member 12 in a variety of patterns, shapes, and thicknesses to accommodate the particular size, shape, and dimensions of the cavity to be filled by the reinforcing material 14 after activation. The placement of the member 12 along the selected frame or rail 16 as well as placement of the material 14 along the surfaces of the member 12 itself, and particularly either or both of the interior portion and exterior portion of the member 12, can be applied in a variety of patterns and thicknesses to target or tune energy management enhancement or deformation reduction in selected areas of the vehicle where a reduction or redirection of impact energy would serve to limit damage to the vehicle passenger compartment and permit ingress and egress to the vehicle for passengers. The material 14 is activated through the application of heat typically encountered in an automotive e-coat oven or other heating operation in the space defined between the member 12, now attached to the frame or rail 16 in either or pre-production facility or the final vehicle assembly operation. The resulting composite structure includes a wall structure formed by the rail or frame 16 joined to the at least one member 12 with the aid of the material 14. It has been found that structural attachment through the use of the member 12 and the material 14 is best achieved when the material 14 is selected from materials such as those offered under product designations L-5204, L-5205, L-5206, L-5207, L-5208, L-5209, L-5214, and L-5222 sold by L&L Products, Inc. of Romeo, Mich. For semi-structural attachment of the frame or rail 16 through the use of the member 12 and the material 14, best results were achieved when the material 14 is selected from materials such as those offered under product designations L-4100, L-4200, L-4000, L-2100, L-1066, L-2106, and L-2108 sold by L&L Products, Inc. of Romeo, Mich.

Figure 7:
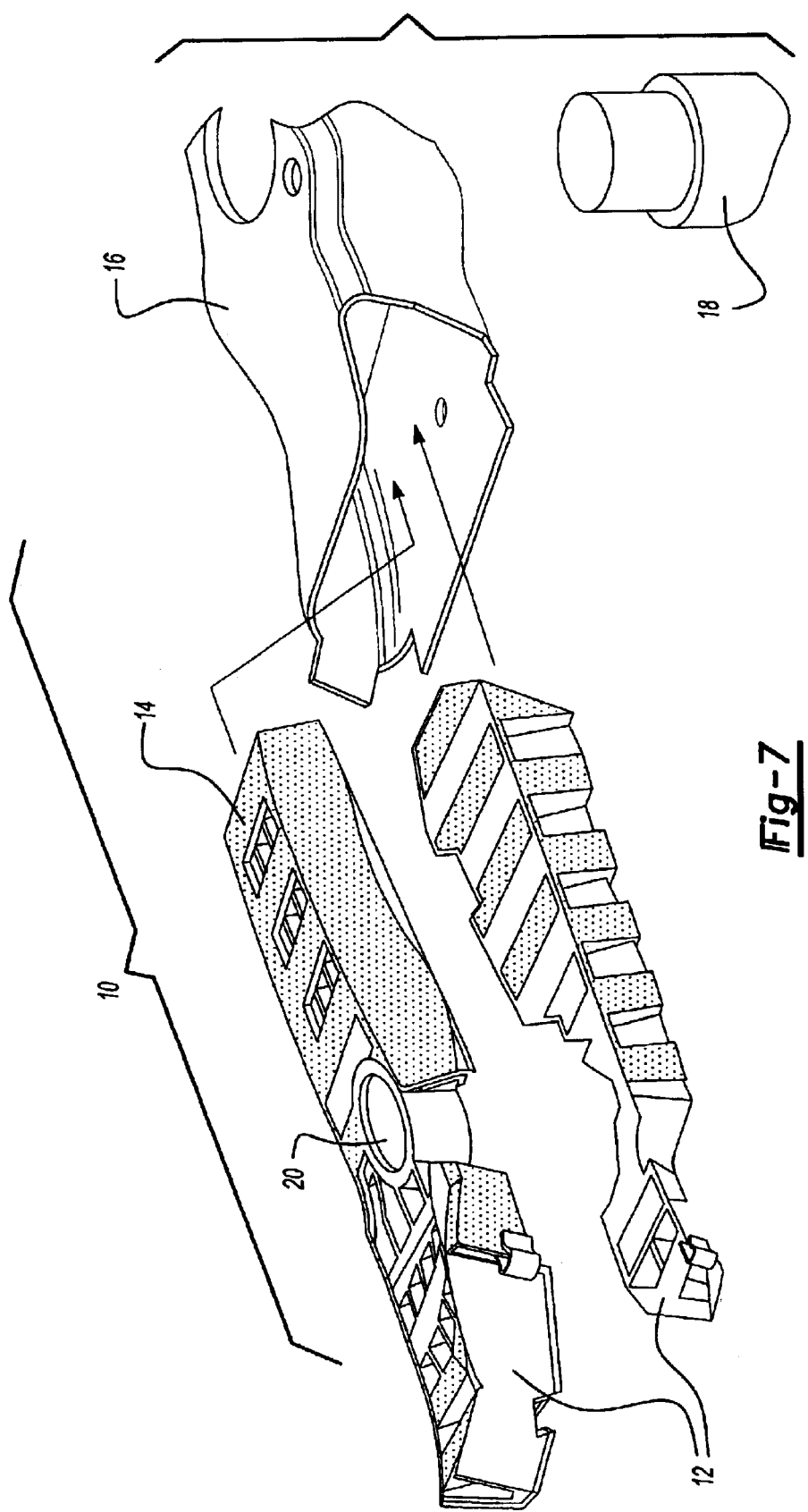
FIG. 7 is an exploded perspective view of the present invention, showing an alternative embodiment of the system disposed within a closed form wherein the plurality of members are inter-locking and retained by a third member also incorporating a self-locking mechanism and the trigger of the present invention is depicted as a hole extending through the interior portion of the member.

The properties of the reinforcing material 14 include structural foam characteristics, which are preferably heat-activated to expand and cure upon heating, typically accomplished by gas release foaming coupled with a cross-linking chemical reaction. The material 14 is generally applied to the member 12 in a solid or semi-solid state. The material 14 may be applied to the outer surface of the member 12 in a fluid state using commonly known manufacturing techniques, wherein the material 14 is heated to a temperature that permits the foamable material to flow slightly to aid in substrate wetting. Upon curing the material 14 hardens and adheres to the outer surface of the member 12. Alternatively, the material 14 may be applied to the member 12 as precast pellets, which are heated slightly to permit the pellets to bond to the outer surface of the member 12. At this stage, the material 14 is heated just enough to flow slightly, but not enough to cause the material 14 to thermally expand. Additionally, the material 14 may also be applied by heat bonding/thermoforming or by co-extrusion. Note that other stimuli activated materials capable of bonding can be used, such as, without limitation, an encapsulated mixture of materials that, when activated by temperature, pressure, chemically, or other by other ambient conditions, will become chemically active. To this end, one aspect of the present invention is to facilitate a streamlined manufacturing process whereby the material 14 can be placed along the member 12 in a desired configuration wherein the member 12 is then attached by the attachment means 18 or geometrically constrained to the frame or rail 16 without attachment means at a point before final assembly of the vehicle. As shown in FIGS. 3 and 4, the attachment means 18 of the present invention may comprise a clip which is well known in the art. In this regard, the system 10 of the present invention provides at least one, but possibly a plurality of, members 12 which are placed along and attached to the selected frame or rail 16 such that adequate clearance remains for existing and necessary hardware that may be located inside a traditional automotive body cavity to provide window movement, door trim, etc. As shown in FIG. 7, the system 10 may also be used in hydroform applications wherein a plurality of interlocking members 12 are shaped for placement within a closed and then restrained by an attachment means 18 consisting of a self-interlocking retention piece. In the particular hydroform embodiment shown in FIG. 7, the trigger or triggers 20 of the present invention consists of a hole or deformation extending through the interior portion of the interlocking members 12 and may further comprise step change in the geometry of the wall thickness of the interlocking members 12.

The energy management enhancement system 10 disclosed in the present invention may be used in a variety of applications where reinforcement is desired to transfer, direct, and/or absorb impact energy that may be applied to structural members of an automotive vehicle through an external source or collision to the vehicle. As shown in FIG. 8 in a pre-impact state, the system 10 may be used to control and direct energy management in frontal impact testing of automotive vehicles through targeted bending, buckling, and collapsing of the system in a progressive manner while still providing some reinforcement stability in the bending process resulting in the system shown in a post-impact state in FIG. 9. Namely, as shown in FIGS. 8 and 9, axial collapse may be created by opposing or dual bending modes through the use of a plurality of triggers 20. The system 10 has particular application in automotive frame or rail applications where the overall weight of the structure being reinforced is a critical factor and there is a need for reinforcement and/or inhibition of deformation and distortion resulting from an impact to the vehicle. For instance, the system 10 may be used to reduce or inhibit structural distortion of portions of automotive vehicles, aircraft, marine vehicles, building structures or other similar objects that may be subject to an impact or other applied structural force through either natural or man-made means. In the embodiment disclosed, the system 10 is used as part of an automobile frame or rail assembly to inhibit distortion of selected areas of an automobile through the transfer and/or absorption of applied energy, and may also be utilized in conjunction with rockers, cross-members, chassis engine cradles, roof systems, roof bows, lift gates, roof headers, roof rails, fender assemblies, pillar assemblies, radiator/rad supports, bumpers, body panels such as hoods, trunks, hatches, cargo doors, front end structures, and door impact bars in automotive vehicles as well as other portions of an automotive vehicle which may be adjacent to the exterior of the vehicle. The skilled artisan will appreciate that the system may be employed in combination with or as a component of a conventional sound blocking baffle, or a vehicle structural reinforcement system, such as is disclosed in commonly owned co-pending U.S. patent application Ser. No. 09/524,961 and U.S. Pat. No. 6,467,834, both of which are hereby incorporated by reference.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An energy management enhancement system for reducing and inhibiting distortion characteristics of an automotive vehicle in the event of impact from an external force, comprising:

(a) at least one member having an interior and an exterior portion adapted for placement in a cavity disposed in an automotive frame assembly; and a plurality of step changes to the geometry of the member for defining a triggers along said member, a first of the plurality of step changes being on a first side of the member and a second of the plurality of step changes being on a second side of the member opposite the first side; and (b) an expandable reinforcing material bonded over at least a portion of said member.

2. The system as claimed in claim 1, wherein said member is configured for reinforcing a portion of an automotive vehicle selected from the group consisting of a rail member, a frame member, a door assembly, a rocker, a frame cross member, a vehicle pillar assembly and a vehicle roof system.

3. The system as claimed in claim 1, wherein said member is configured for reinforcing a portion of an automotive vehicle selected from the group consisting of a vehicle window frame, a vehicle deck lid, a lift gate, a vehicle pillar assembly, and a vehicle hatch.

4. The system as claimed in claim 1, wherein said member is configured for reinforcing a portion of an automotive vehicle selected from the group consisting of a vehicle roof system, a roof bow, a roof tail, and a roof header.

5. The system as claimed in claim 1, wherein said member is adapted for reducing impact energy deformation of portions of an automotive vehicle selected from the group consisting of a fender assembly, bumper, and front end structure.

6. The system as claimed in claim 1, wherein said member comprises a material selected from the group consisting of aluminum, an aluminum foam, a low density filler, a magnesium alloy, a molded magnesium alloy, a magnesium foam, a titanium alloy, a molded titanium alloy, and a titanium foam.

7. The system as claimed in claim 1, wherein said member comprises a material selected from the group consisting of a syntactic foam, aluminum pellets, aluminum foam pellets, phenolic resin, polyamide, polysulfone, concrete, and carbon fillers.

8. The system as claimed in claim 1 wherein the first of the plurality of step changes and the second of the plurality of step changes are each selected from the group of a notch, a cut-away section or a hole.

9. The system as claimed in claim 1 wherein the first of the plurality of step changes and the second of the step changes are configured to, upon impact, cause axial bending that assists in maximizing axial crush of the system while also reducing deformation of an occupant compartment.

10. The system as claimed in claim 8 wherein the first of the plurality of step changes and the second of the step changes are configured to, upon impact, cause axial bending that assists in maximizing axial crush of the system while also reducing deformation of an occupant compartment.

11. The system as claimed in claim 10 wherein the first of the plurality of step changes and the second of the plurality of step changes are notches.

12. An impact distortion reduction system, comprising:
 (a) a frame rail suitable for use as a structural member in an automotive vehicle, said frame rail having an exposed surface portion;
 (b) at least one member, including a plurality of notches for defining triggers, and being fixedly adhered to said exposed surface portion of said frame rail; and
 (c) a thermally activatable foamable polymeric reinforcing material for managing impact energy disposed over at least a portion of said member and which bonds to said frame rail after thermal activation and expansion.

13. A reinforcement system for an automotive vehicle, comprising:
 an automotive vehicle structure selected from a frame rail or a pillar;
 a molded polymeric member having a first arcuate surface on a first side and a second arcuate surface on an opposing second side and a plurality of geometric step changes including a first of the plurality of step changes located adjacent to the first side and a second of the plurality of step changes located adjacent the second side, wherein the molded polymeric member is configured for insertion into a cavity of an automotive vehicle structural member and wherein the first of the plurality of step changes and the second of the plurality of step changes are each selected from the group of a notch or a cut-away section;
 an expandable heat activated material applied to one or more surfaces of the molded polymeric member; and
 wherein i) the molded polymeric member is shaped to correspond to the cavity of the vehicle structural member, ii) the expandable heat activated material upon being activated secures the molded polymeric member to the corresponding structural member, and iii) the geometric step changes act to create stress risers to cause opposing localized bending modes in the automotive vehicle structure for assisting in maximizing axial collapse.

14. The reinforcement assembly of claim 13 wherein the first of the plurality of geometric step changes and the second of the plurality of geometric step changes are both notches.

15. The system as claimed in claim 13 wherein the expandable heat activated material is an extruded or molded piece applied over the rigid member.

16. The system as claimed in claim 13 wherein the expandable heat activated material includes an epoxy.

17. The system as claimed in claim 13 wherein the rigid member includes a polyurethane.

18. The reinforcement assembly of claim 13 further comprising at least one fastener for attaching the reinforcement assembly to the automotive structural member.

19. The reinforcement assembly of claim 14 further comprising at least one fastener for attaching the reinforcement assembly to the automotive structural member.

20. The reinforcement assembly of claim 15 further comprising at least one fastener for attaching the reinforcement assembly to the automotive structural member.

21. The system as claimed in claim 13 wherein the polymeric member is fixedly secured to the automotive vehicle structure by fastening or adhering.

22. The system as claimed in claim 14 wherein the polymeric member is fixedly adhered to the automotive vehicle structure.

* * * * *

UNITED STATES PATENT AND TRADEMARK OFFICE
CERTIFICATE OF CORRECTION

PATENT NO. : 6,793,274 B2
DATED : September 21, 2004
INVENTOR(S) : John Riley and Michael J. Czaplicki Page 1 of 1

It is certified that error appears in the above-identified patent and that said Letters Patent is hereby corrected as shown below:

<u>Column 14,</u>
Line 31, replace "defining a triggers" with -- defining triggers --.

Signed and Sealed this

Nineteenth Day of April, 2005

JON W. DUDAS
*Director of the United States Patent and Trademark Office*